United States Patent
Xu et al.

(10) Patent No.: US 11,804,029 B2
(45) Date of Patent: Oct. 31, 2023

(54) HIERARCHICAL CONSTRAINT (HC)-BASED METHOD AND SYSTEM FOR CLASSIFYING FINE-GRAINED GRAPTOLITE IMAGES

(71) Applicants: Nanjing Institute of Geology and Palaeontology, CAS, Nanjing (CN); Tianjin University, Tianjin (CN)

(72) Inventors: Honghe Xu, Nanjing (CN); Yaohua Pan, Nanjing (CN); Zhibin Niu, Nanjing (CN)

(73) Assignees: Nanjing Institute of Geology and Palaeontology, CAS, Nanjing (CN); Tianjin University, Tianjin (CN)

( * ) Notice: Subject to any disclaimer, the term of this patent is extended or adjusted under 35 U.S.C. 154(b) by 0 days.

(21) Appl. No.: 18/147,019

(22) Filed: Dec. 28, 2022

(65) Prior Publication Data

US 2023/0267703 A1    Aug. 24, 2023

(30) Foreign Application Priority Data

Feb. 22, 2022 (CN) .......................... 202210159814.4

(51) Int. Cl.
| | |
|---|---|
| *G06V 10/74* | (2022.01) |
| *G06V 10/764* | (2022.01) |
| *G06V 10/774* | (2022.01) |
| *G06V 10/82* | (2022.01) |
| *G06V 10/24* | (2022.01) |
| *G06V 10/77* | (2022.01) |
| *G06V 10/26* | (2022.01) |

(52) U.S. Cl.
CPC ............ *G06V 10/761* (2022.01); *G06V 10/24* (2022.01); *G06V 10/26* (2022.01); *G06V 10/764* (2022.01); *G06V 10/774* (2022.01); *G06V 10/7715* (2022.01); *G06V 10/82* (2022.01)

(58) Field of Classification Search
CPC ...... G06V 10/761; G06V 10/24; G06V 10/26; G06V 10/764; G06V 10/7715; G06V 10/774; G06V 10/82
See application file for complete search history.

(56) References Cited

U.S. PATENT DOCUMENTS

| | | | |
|---|---|---|---|
| 2016/0196479 A1* | 7/2016 | Chertok | ............. G06V 10/7557 382/156 |
| 2020/0367422 A1* | 11/2020 | Shniberg | ................. G06T 7/001 |

(Continued)

OTHER PUBLICATIONS

U.S. Appl. No. 18/147,019, filed Dec. 28, 2022.

(Continued)

*Primary Examiner* — Ming Y Hon
(74) *Attorney, Agent, or Firm* — HOUSTONHOGLE LLP

(57) ABSTRACT

The present disclosure relates to a hierarchical constraint (HC) based method and system for classifying fine-grained graptolite images. The method includes: constructing a graptolite fossil dataset; extracting features in graptolite images; calculating the similarity between graptolite images, and performing weighting according to a genetic relationship among species to obtain a weighted HC loss function (HC-Loss) of all graptolite images; calculating cross-entropy loss; taking a weighted sum of HC-Loss and CE-Loss as a total loss function in a training stage; and performing model training. The system of the present disclosure includes a processor and a memory.

20 Claims, 9 Drawing Sheets

(56) References Cited

U.S. PATENT DOCUMENTS

| | | | | |
|---|---|---|---|---|
| 2021/0365745 | A1* | 11/2021 | Browning | G06V 10/809 |
| 2022/0101147 | A1* | 3/2022 | Konno | G16B 40/20 |
| 2023/0070719 | A1* | 3/2023 | Jeon | G06V 40/10 |
| 2023/0077353 | A1* | 3/2023 | Chellappan | G06F 18/217 |
| | | | | 382/110 |

OTHER PUBLICATIONS

Dubey, A. et al., "Pairwise Confusion for Fine-Grained Visual Classification", *Proceedings of the European conference on computer vision (ECCV)*, arXiv:1705.08016 v3, (2018). 25 pages.

Zou, C. et al., "Importance of graptolite evolution and biostratigraphic calibration on shale gas exploration", *China Petroleum Exploration*, vol. 24 Issue 1, 1672-7703, (2019). 6 pages.

\* cited by examiner

Experimental results regarding the graptolite fossil dataset based on advanced fine-grained image classification methods

| Method | Basic model | Accuracy | Scale of model parameter (MB) | Δ |
|---|---|---|---|---|
| VGG16 | VGG16 | 59.95% | 66.98 | - |
| B-CNN | VGG16 | 54.21% | 169.13 | -5.74% |
| HBP | VGG16 | 53.90% | 219.05 | -6.05% |
| DFL-CNN | VGG16 | 60.23% | 59.16 | +0.28% |
| Resnet50 | Resnet50 | 62.78% | 90.56 | - |
| NTS-Net | Resnet50 | 60.99% | 111.14 | -1.79% |
| PC | Resnet50 | 62.59% | 90.56 | -0.19% |
| MC-Loss | Resnet50 | 61.97% | 93.92 | -0.81% |
| PMG | Resnet50 | 62.10% | 172.16 | -0.68% |

FIG. 5

Experimental result regarding the graptolite fossil dataset based on HC-Loss

| Method | Accuracy | Δ |
|---|---|---|
| Graptolite fossil dataset | | |
| VGG16 | 59.95% | - |
| HC-VGG16 | 61.13% | +1.18% |
| Inception-v3 | 63.62% | - |
| HC-Inception-v3 | 64.19% | +0.57% |
| ResNet50 | 62.78% | - |
| HC-ResNet50 | 63.39% | +0.61% |

FIG. 6

Experimental result of classification hierarchies of genus and family regarding the graptolite fossil dataset based on HC-Loss

| Classification hierarchy | Method | Accuracy | Δ |
|---|---|---|---|
| Genus | VGG16 | 70.27% | - |
| | HC-VGG16 | 71.84% | +1.57% |
| | Inception-v3 | 73.31% | - |
| | HC-Inception-v3 | 74.66% | +1.35% |
| | ResNet50 | 73.50% | - |
| | HC-ResNet50 | 74.47% | +0.97% |
| Family | VGG16 | 79.54% | - |
| | HC-VGG16 | 81.02% | +1.48% |
| | Inception-v3 | 82.83% | - |
| | HC-Inception-v3 | 83.14% | +0.31% |
| | ResNet50 | 82.21% | - |
| | HC-ResNet50 | 83.31% | +1.10% |

FIG. 7

Experimental result on a CUB-200-2011 dataset based on HC-Loss

| Method | Accuracy | Δ |
|---|---|---|
| CUB-200-2011 dataset | | |
| VGG16 | 78.46% | - |
| HC-VGG16 | 79.32% | +0.86% |
| Inception V3 | 83.19% | - |
| HC-Inception-V3 | 84.34% | +1.15% |
| Resnet50 | 84.52% | - |
| HC-Resnet50 | 86.51% | +1.99% |
| Densenet161 | 85.33% | - |
| HC-Densenet161 | 88.06% | +2.73% |

FIG. 8

HIERARCHICAL CONSTRAINT (HC)-BASED METHOD AND SYSTEM FOR CLASSIFYING FINE-GRAINED GRAPTOLITE IMAGES

CROSS REFERENCE TO RELATED APPLICATION

This patent application claims the benefit and priority of Chinese Patent Application 202210159814.4, filed with the China National Intellectual Property Administration on Feb. 22, 2022, the disclosure of which is incorporated by reference herein in its entirety as part of the present application.

TECHNICAL FIELD

The present disclosure belongs to the field of fine-grained image classification, and relates to a method and system for identifying graptolite specimens through graptolite fossil images by Convolutional Neural Network (CNN).

BACKGROUND

Image classification is one of typical tasks in the field of computer vision. Fine-grained image classification refers to the finer division of subcategories on the basis of distinguishing large categories, so it is also called subcategory classification (such as distinguishing dogs of different breeds, birds of different kinds, flowers of different kinds, etc.). Specifically, fine-grained graptolite image classification emphasizes the identification of detailed graptolite genus, species and/or sub-species to a paleontology taxonomist level based on specimen's image. Graptolite species-level classification relies on examinations of fossil specimens and is one of taxonomist's research jobs in paleontology, as well as can be used to improve the efficiency of shale gas exploration (Zou C, Gong J, Wang H, et al. Importance of graptolite evolution and biostratigraphic calibration on shale gas exploration[J]. China Petroleum Exploration, 2019.). Due to subtle differences between subcategories, it has always been a challenging task to classify fine-grained images, especially biological or fossil images containing complex genetic and evolutionary relationships.

During fine-grained image classification, it is required to judge the specific subcategory a specimen in the image belongs to. To deal with an image, it is supposed to firstly extract its features, then process the extracted features and map them to a classification space to obtain distribution of the probability that a specimen in the image belongs to a certain category. Compared with the traditional methods using artificial features, features extracted by CNN have stronger representation ability and differentiation, and can be used for end-to-end training. Therefore, in the mainstream research on fine-grained image classification, CNN is often used to extract and classify features. CNN performs a series of matrix operations to obtain predicted probability distribution by using a large number of intermediate parameters and inputted images, then calculates the difference (loss) between the predicted probability distribution and true label distribution, and optimizes the model parameters by gradient descent method, so that the prediction results of CNN gradually approach the true results in the process of training.

Graptolites are extinct colonial animals that lived in colonies and shared the same skeleton. Graptolite fossils are often found flattened and carbonized along the bedding plane of shale. Previously, the identification of graptolite species has mainly relied on human visual examinations of specimens, rather than methods involving chemistry, spectrum, molecular biology, genomics, or histology. Graptolite organisms have lost their soft tissues during fossilization and most are found flattened and carbonized. Paleontology taxonomists identify graptolite based on examinations using a hand lens in the fieldwork, whilst determine accurate species after removing the coverings and applying diagnostic measurements aided with microscope in the laboratory. Compared with traditional biological images collected from organisms taking different forms, graptolite images have characteristics of unclear texture, lack of tissue structure, single form, false color and texture. At present, most of the advanced fine-grained image classification methods are based on CNN, and aim at designing a complex feature extraction module to obtain interactive features or locate local areas in the image to learn more fine-grained discriminant features. Generally, these methods would greatly increase the number of network parameters, which may cause CNN to learn false colors, veins and other features in graptolite images, thus lead to poor classification results.

In the study of Dubey et al. (Dubey A, Gupta O, Guo P, et al. Pairwise confusion for fine-grained visual classification[C]//Proceedings of the European conference on computer vision (ECCV). 2018: 70-86.), a method of using the distance between images as a regularization term of a loss function was proposed. According to this method, the loss function does not diverge when the similarity between image features that is calculated by Euclidean distance is used as the regularization term of cross-entropy loss, such that CNN can outperform other distance measurement functions. However, the authors ignored the relationship of biological images at different classification levels. Considering different types of biological images, their similarities and subordinate relationship between categories must be closely related and taken into account.

SUMMARY

Aiming at automatic classification of graptolites, the present disclosure provides a method and a system for classifying fine-grained fossil organism images, especially graptolite images, based on Hierarchical Constraint Loss (HC-Loss). According to the present disclosure, the HC-Loss takes into full account of development tendency of the field of fine-grained image classification, as well as the features of graptolite images, the similarity between inputted images is measured using a hierarchical genetic relationship between species, and the similarity is added as a regularization term to the loss function, which can reduce the number of parameters of CNN in the process of backward propagation, so as to prevent the CNN from paying too much attention to detail features of two similar images that do not belong to the same category, and solve the problem of differences between small categories.

Technical solutions of the present disclosure are as follows:

The present disclosure provides an HC-based method for classifying fine-grained graptolite images, including:

step 1, collecting an original graptolite image;

step 2, annotating fine granularity of a graptolite specimen in the original graptolite image;

step 3, obtaining a graptolite image representing the graptolite specimen, and constructing a graptolite dataset;

step 4, extracting features in the graptolite image by a CNN model, which specifically includes: extracting a feature map from an input graptolite image by convolution, activation and pooling operation of the CNN model to obtain a feature vector; and projecting, by an embedding layer, the feature vector into a feature with a dimension being a number of categories in the dataset, where a feature vector obtained after projection represents a prediction vector of the CNN to the input graptolite image, each value in the prediction vector represents a prediction score of a corresponding category of the graptolite image, and the higher the prediction score, the greater the probability that a graptolite in the graptolite image belongs to this category;

step 5, calculating a similarity between graptolite images, and performing weighting according to the genetic relationship among species to obtain a weighted HC loss function (HC-Loss) of all graptolite images, which specifically includes:

(1) for two graptolite images in each graptolite image pair, quantifying a similarity weight according to the genetic relationship of categories graptolites in the two graptolite images belong, where for the graptolite images belonging to two categories, the closer the genetic relationship is, the greater the degree of similarity is, and the greater the similarity weight value is; on the contrary, the farther the genetic relationship is, the smaller the similarity weight value is; and (2) in each training batch, calculating the weighted HC-Loss of all graptolite images by the following process: calculating a Euclidean distance between prediction vectors of two graptolite images in each graptolite image pair; according to the similarity weight value for each graptolite image pair, making weighted summation on the similarity of all groups of graptolite image pairs, and dividing a sum by the number of groups to obtain weighted HC-Loss of all graptolite images;

step 6, calculating cross-entropy loss (CE-Loss) used to represent a difference between predicted probability distribution of the CNN model and real label distribution of images;

step 7, taking a weighted sum of HC-Loss and CE-Loss as a total loss function of the CNN model in a training stage; and step 8, training the CNN model.

Further, in step 1, the collected original graptolite image includes high-resolution images covering various families, genera and species.

Further, step 3 specifically includes: according to an annotation result, conducting cropping at a pixel level, cropping by an annotation box, and data enhancement on the original graptolite image to obtain a graptolite image representing the graptolite specimen.

Further, step 4 is executed by the following process: extracting, from an input graptolite fossil image x, a feature map $f_x$ with respect to x by the convolution, activation and pooling operation of the CNN model, and setting a size of $f_x$ to C×H×W, where C, H and W denote a channel, a height and a width of the feature map, respectively; and expanding the feature map $f_x$ to a feature vector with one dimension being C×H×W, and projecting the feature vector into a feature vector with a dimension of N through an embedding layer, where N denotes a number of categories in a dataset, the embedding layer is implemented through a fully connected layer, and the final image feature vector represents a prediction vector of the CNN model to the inputted image x.

Further, the Euclidean distance between prediction vectors of two graptolite images in each graptolite image pair is expressed as follows:

$$d(\varphi(x_m), \varphi(x_n)) = \sqrt{\sum_{i=1}^{N}(\varphi(x_m)_i, \varphi(x_n)_i)^2}$$

where $(x_m, x_n)$ denotes a graptolite image pair, $\varphi(x)$ denotes a prediction vector regarding a graptolite image x extracted from the CNN model, $\varphi(x)_i$ denotes an ith element in the prediction vector, and $d(\cdot)$ denotes a Euclidean distance.

Specifically, in step 5, said setting a similarity weight value for a graptolite image pair according to the categories and genetic relationship includes:

if two graptolite images of a graptolite image pair belong to the same category and a lowest common parent category is at a species level, setting the similarity weight value to 0;

if two graptolite images of a graptolite image pair belong to different species of the same genus and a lowest common parent category is at a genus level, setting the similarity weight value to 1.0;

if two graptolite images of a graptolite image pair belong to different genera of the same family and a lowest common parent category is at a family level, setting the similarity weight value to be greater than 0.5 and less than 1.0; and if two graptolite images of a graptolite image pair belong to different families and a lowest common parent category is at an order level, setting the similarity weight value to be greater than 0.1 and less than 0.3.

In step 5, if two graptolite images of a graptolite image pair belong to different genera of the same family and a lowest common parent category is at a family level, the similarity weight value is set to be 0.6.

In step 5, if two graptolite images of a graptolite image pair belong to different families and a lowest common parent category is at an order level, the similarity weight value is set to be 0.2.

The present disclosure also provides an HC-based system for classifying fine-grained graptolite images, including a processor and a memory, where the memory has a program instruction stored therein, and the processor calls the program instruction stored in the memory to enable the system to execute the steps of the foregoing method.

In addition, the present disclosure provides a computer readable storage medium, where the computer readable storage medium stores a computer program that includes program instructions, and the program instructions, when executed by a processor, enable the processor to execute the steps of the foregoing method.

BRIEF DESCRIPTION OF DRAWINGS

FIG. 5 shows an experimental result regarding the graptolite dataset according to a method for classifying fine-grained graptolite images.

FIG. 6 shows an experimental result regarding the graptolite dataset based on HC-Loss.

FIG. 7 shows an experimental result of different classification hierarchies regarding the graptolite dataset based on HC-Loss.

FIG. 8 shows an experimental result on a CUB-200-2011 dataset based on HC-Loss.

DETAILED DESCRIPTION OF THE EMBODIMENTS

To make the technical solutions of the present disclosure clearer, the present disclosure is further described below with reference to the accompanying drawings and specific embodiments.

Figure 1:
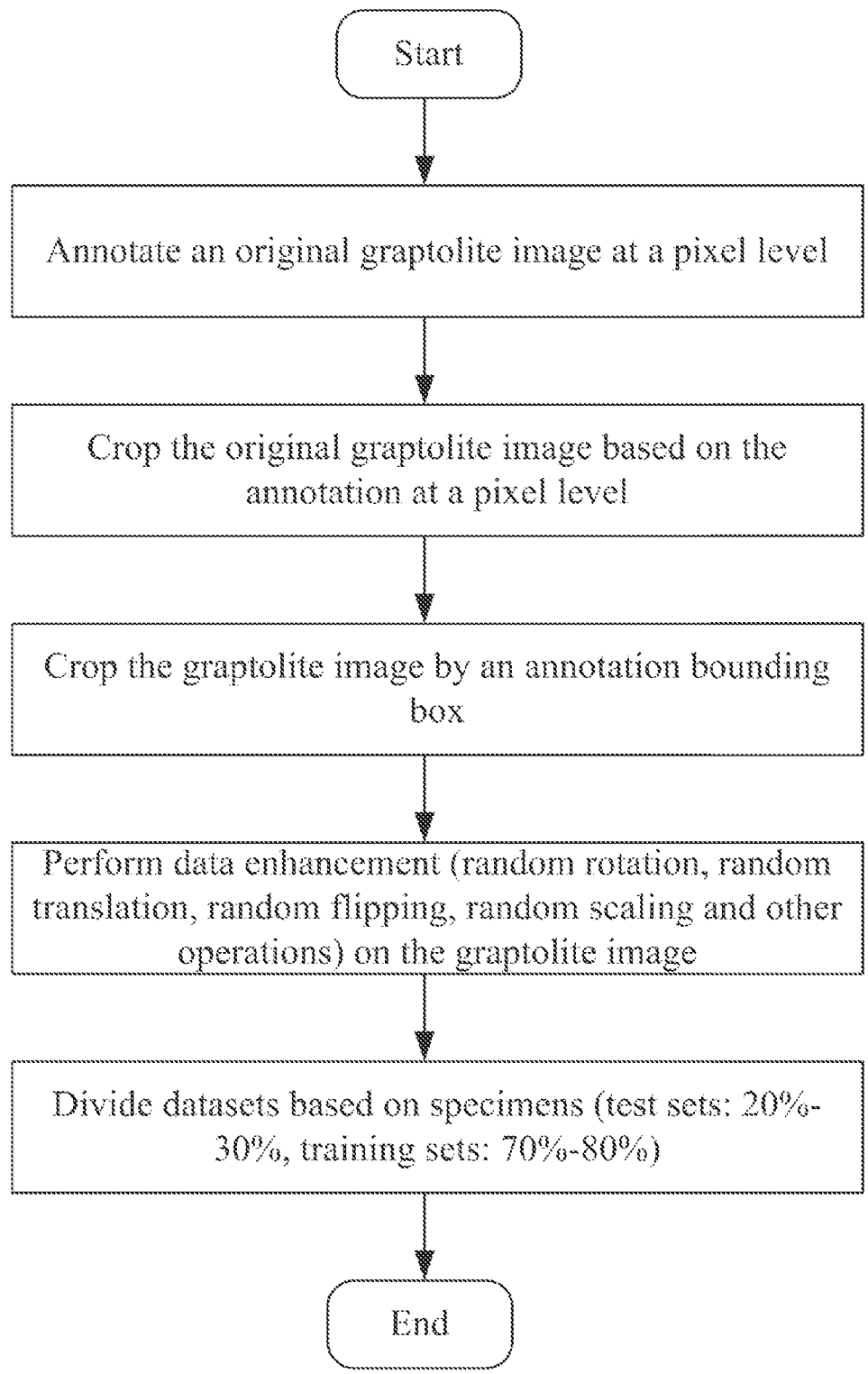
FIG. 1 shows a construction process of a graptolite dataset.

The present disclosure is inspired by the following priori knowledge: organisms are born with attributes of being classified to different hierarchies, and from the perspective of classification hierarchies, subcategory specimens belonging to the same parent category have similar morphological characteristics, and the degree of similarity usually increases with the decrease of the level of their lowest common parent category. Therefore, compared with the current advanced fine-grained image classification method, the present disclosure can achieve higher classification accuracy on graptolite images, and is also suitable for other biological images. In addition, the present disclosure does not introduce additional parameters in the CNN training stage, and can be added to any CNN to carry out end-to-end training. FIG. 1 shows a construction process of a graptolite dataset. In the flowchart, the first two steps are both involved in the processing of the original graptolite images. After the third step of cropping, the graptolite image representing a graptolite specimen is obtained, and then a graptolite dataset is constructed by data enhancement. The method in the present disclosure is implemented according to the following steps:

Step 1, Construct a graptolite dataset.

(1) Perform Graptolite Image Collection and Fine Granularity Annotation.

All the original graptolite images (also known as graptolite fossil images) are collected from 1,565 fossil specimens stored in Nanjing Institute of Geology and Palaeontology, Chinese Academy of Sciences. Finally, a total of 40,597 original graptolite images are collected, including 20,644 SLR images (each with a resolution of 4,912*7,360 pixels) and 19,953 microscope images (each with a resolution of 2,720*2,048 pixels). The dataset is then cleaned, from which 5,977 low-quality original graptolite images are deleted. Finally, the dataset retains 34,613 cleaned original graptolite images, covering 15 families, 42 genera and 113 species. After image collection, the annotator uses COCO Annotator (an open source image annotation tool) to mark graptolite specimens in the cleaned original graptolite images at a pixel level.

(2) Perform Graptolite Image Cropping and Data Enhancement.

Since fossils are prone to natural factors like weathering and erosion, the tissue structure and texture features of graptolite have been seriously destroyed, and there are problems such as feature missing and indistinguishability. Considering this situation, researchers first crop all the original graptolite images at the pixel level according to the annotation results, so as to improve the classification accuracy of CNN. Then, because the resolution of the original graptolite image is very high, and the proportion of some graptolite specimens is too small, all the graptolite original images are cropped by an annotation box to scale the graptolite specimens to an appropriate proportion, so as to obtain the graptolite images representing the graptolite specimens. In addition, because the original graptolite images all come from specimens, different original graptolite images collected from the same specimen may be very similar after the above two steps of cropping, the graptolite images are further augmented by random rotation, random flipping, random translation, random scaling and other operations to enhance the diversity of images in the dataset, and thus enhance the model's generalize ability (e.g., to enable the model to adapt to various test images).

(3) Perform Division of Graptolite Datasets.

Because the original graptolite images come from specimens, different original graptolite images collected from the same specimen may present similar visual content, and they are only different in angle, spatial position and specimen size. Therefore, the graptolite datasets are not divided randomly, but in accordance with the following principle: the graptolite images belonging to the same specimen cannot exist in the training set and the test set at the same time. Rather, they should be put together. Finally, divided test sets contain 8,454 graptolite images, accounting for about 24% of the total images contained in datasets, while training sets contain 26,159 graptolite images, accounting for about 76% of the total images contained in graptolite datasets.

Step 2, Extract features of a graptolite image using CNN.

Figure 3:
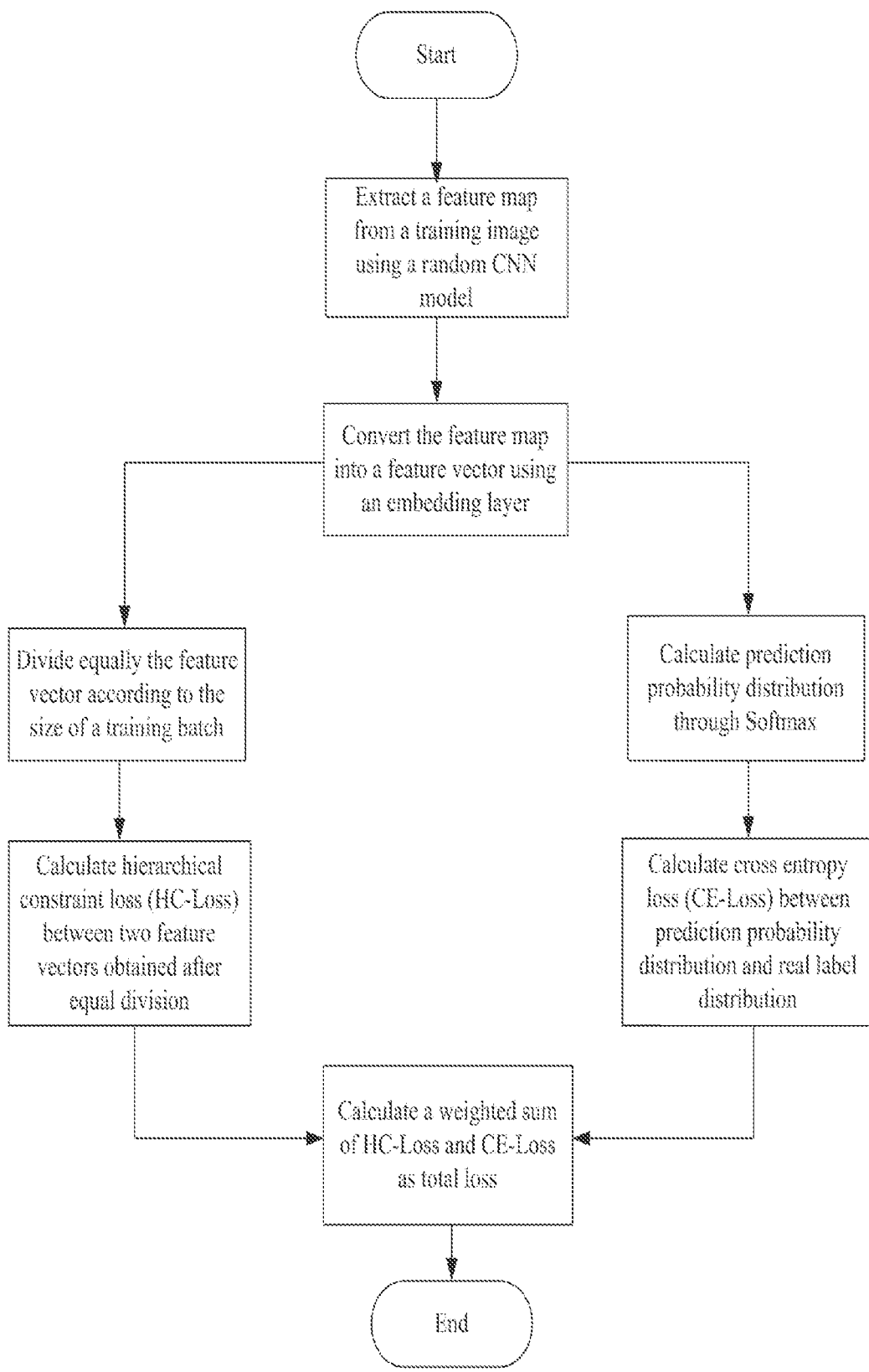
FIG. 3 shows a CNN training process based on HC-Loss.

As shown in FIG. 3, a feature map $f_x$ with respect to x is extracted from an input graptolite image x by the convolution, activation and pooling operation of CNN. Set a size of $f_x$ to C×H×W, where C, H and W denote the channel, height and width of the feature map, respectively. Then flatten the feature map to a feature vector with a dimension of C×H×W, and project the feature vector into a feature vector with a dimension of N through an embedding layer. N denotes a number of categories in a dataset, and the embedding layer is implemented through a fully connected layer herein. The final image feature vector is also called logits, which represents a prediction vector of the CNN to the input graptolite image, each value in the prediction vector represents a prediction score of a corresponding category of the graptolite image, and the higher the prediction score, the greater the probability that a graptolite in the graptolite image belongs to this category.

Step 3, Calculate a similarity between graptolite images, and perform weighting according to a genetic relationship among species.

Figure 2:
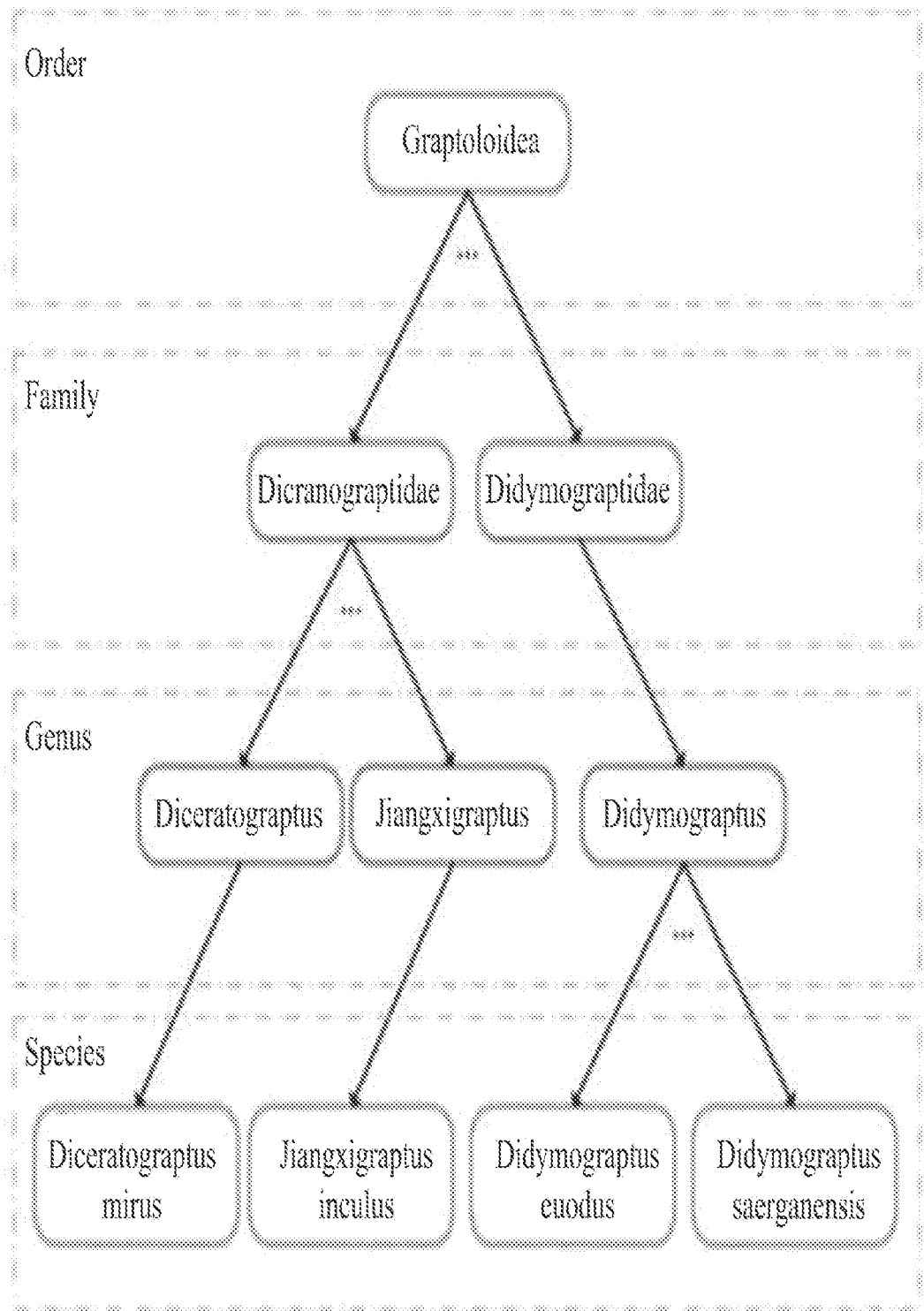
FIG. 2 shows hierarchic classification of the constructed graptolite dataset.
Figure 4:
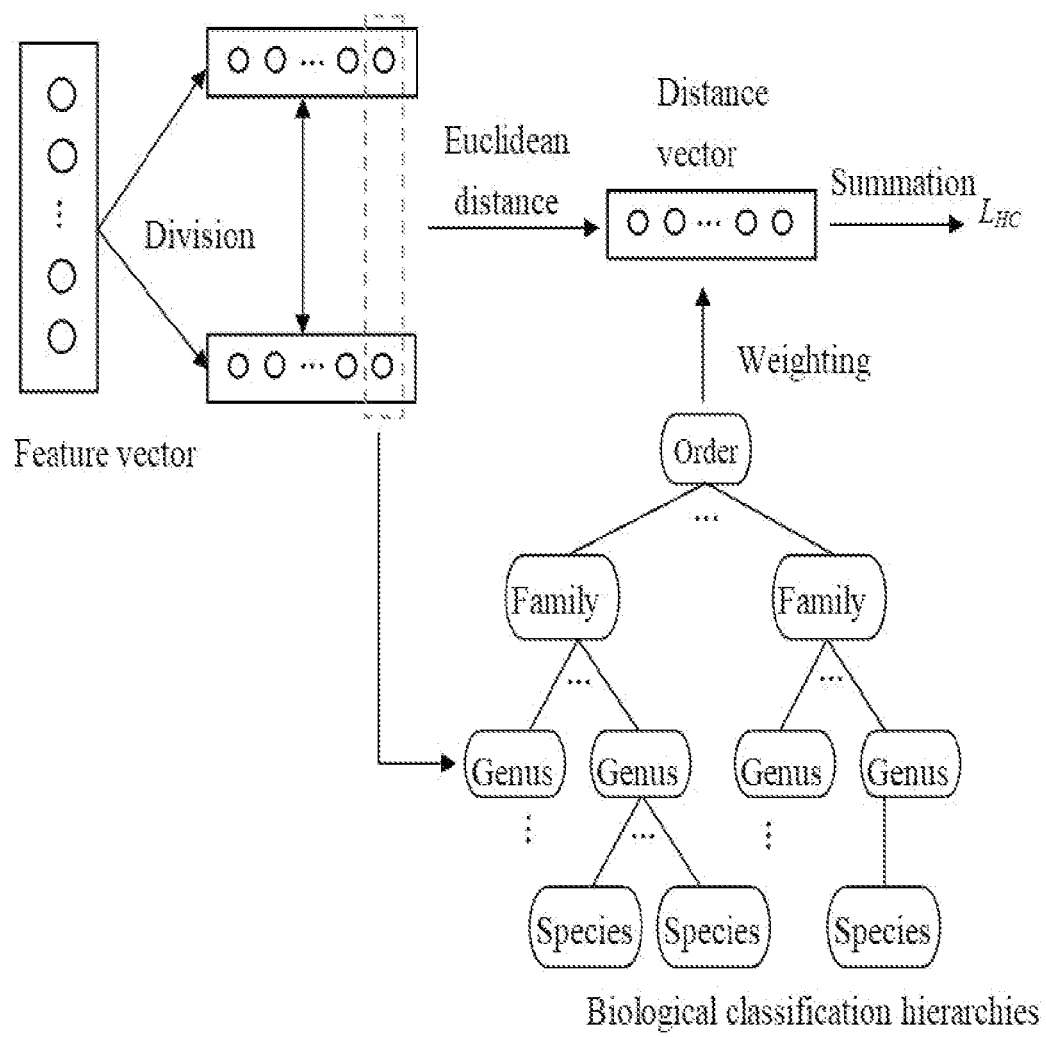
FIG. 4 shows a specific calculation process based on HC-Loss.

As shown in FIG. 4, the specific calculation process of HC-Loss is as follows:

Assume that a batch has a batch size of B, all graptolite images are divided into B/2 groups, where B is set as an even number. Then, for each graptolite image pair $(x_m, x_n)$, a Euclidean distance is used to calculate the similarity between their features as a constraint:

$$d(\varphi(x_m), \varphi(x_n)) = \sqrt{\sum_{i=1}^{N}(\varphi(x_m)_i, \varphi(x_n)_i)^2}$$

Where $\varphi(x)$ denotes a feature vector regarding a graptolite image x extracted from CNN, and $\varphi(x)_i$ denotes an ith element in the feature vector. $d(\cdot)$ denotes a Euclidean distance;

(2) Quantify a similarity weight according to the genetic relationship of categories graptolites in the two graptolite images belong. For graptolite images belonging to two categories, the closer their genetic relationship is, the greater the degree of similarity is, the easier it is for CNN to focus on detail features, which in turn leads to over-fitting. In view of this, the similarity weight value is set larger to constrain the model. On the contrary, the farther the genetic relationship is, the smaller the similarity weight value is. FIG. 2 shows hierarchic classification of the graptolite dataset. Assume $(x_i, x_j)$ denotes a graptolite image pair in a batch that belong to category i and category j, respectively, then they may have one of the following four genetic relationships:

(a) If $x_i$ and $x_j$ belong to the same category, namely, i=j, and a lowest common parent category is at a species level, set the similarity weight value $w_{i,j}$ to 0.

(b) If $x_i$ and $x_j$ belong to different species of the same genus and a lowest common parent category is at a genus level, set the similarity weight value $w_{i,j}$ to 1.0.

(c) If $x_i$ and $x_j$ belong to different genera of the same family and a lowest common parent category is at a family level, set the similarity weight value $w_{i,j}$ to 0.6 (smaller than 1.0).

(d) If $x_i$ and $x_j$ belong to different families and a lowest common parent category is at an order level, set the similarity weight value $w_{i,j}$ to 0.2.

Finally, in each batch, the weighted hierarchical constraint loss (HC-Loss) for all graptolite images is calculated as follows:

$$L_{HC} = \frac{1}{n}\left(\sum_{(x_i,x_j)\in S} w_{i,j} d(\varphi(x_i), \varphi(x_j))\right)$$

Where S denotes all graptolite images in a batch, which are divided into n groups of graptolite image pairs (n=B/2). $w_{i,j}$ denotes a weight value determined according to the genetic relationship in the classification hierarchy according to category i and category j.

Step 4, Calculate a weighted sum of HC-Loss and CE-Loss.

When HC-Loss is adopted, the total loss function Loss(θ) of CNN in the training stage consists of two parts: one is CE-Loss, namely $L_{CE}(\theta)$; and the other is HC-Loss, namely $L_{HC}(\theta)$.

$$\text{Loss}(\theta) = L_{CE}(\theta) + \mu \times L_{HC}(\theta)$$

Where θ denotes all parameters in the CNN model. μ denotes a hyper-parameter configured to control a weight of HC-Loss $L_{HC}$. CE-Loss is calculated as follows:

$$L_{CE} = -\frac{1}{S}\sum_{x}^{S}\sum_{c=1}^{N}\log(p_{x,c})\times y_{x,c}$$

Where y represents the real label distribution, and S represents all the input graptolite images in a batch. $p_{x,c}$ represents the probability value of the category c in the prediction probability distribution of graptolite image x by the CNN model. $p_{x,c}$ is calculated through Softmax function.

In the training stage, the gradient descent method is used to optimize the model parameters in the process of CNN backward propagation. If the input data contains graptolite images which have similar visual content but belong to different categories, the similarity between them is quantified by HC-Loss and used as a constraint term to restrain the model from overlearning the detail features between them, so as to prevent over-fitting and improve the classification accuracy of the model.

Step 5, Test the classification effect of the present disclosure.

Firstly, test the classification effect of the current advanced fine-grained image classification methods on graptolite datasets. As shown in FIG. 5, most of these advanced methods are not as effective as the underlying CNN applied on graptolite datasets. This is because the two mainstream methods of using additional feature learning modules or designing a complex neural network structure cause an excessive number of model parameters, which may lead to the problem of over-fitting, and is thus not suitable for the constructed graptolite dataset.

In contrast, the HC-Loss proposed in the present disclosure can effectively improve the classification accuracy of graptolite images by CNN of different architectures without using additional training parameters, and the classification accuracy is higher than the classification results obtained by the current advanced methods. As shown in FIG. 6, when Resnet50 network is used as the basic CNN, HC-Resnet50 achieves classification accuracy of 63.39%, which is 0.61% higher than that achieved by Resnet50 network only. This result is better than the classification results obtained by all the advanced methods based on Resnet50 model mentioned above. Similarly, when VGG16 network is taken as basic CNN, HC-VGG16 achieves classification accuracy of 61.13%, which is 1.18% higher than that of VGG16, and is also better than the results of all the advanced methods with VGG16 as basic CNN as mentioned above. In addition, when Inception-v3 network is taken as the basic CNN of HC-Loss, HC-Inception-v3 can achieve classification accuracy up to 64.19%, which is 0.57% higher than that of Inception-V3.

HC-Loss can not only improve the classification effect of the model at the species level, but also significantly improve the classification results of CNN at the family and genus levels. As shown in FIG. 7, HC-Loss can improve the classification accuracy of the three basic CNNs at different classification levels.

On biological fine-grained image datasets, HC-Loss can also significantly improve the classification accuracy of CNNs of different architectures. As shown in FIG. 8, HC-Densenet161 achieves a classification accuracy of 88.06% on the CUB-200-2011 dataset, which marks a significant increase of 2.73% over Densenet161. In addition, HC-Loss improves the classification accuracy of Resnet50, VGG16 and Inception-v3 by 1.99%, 0.86% and 1.15%, respectively. These results show that HC-Loss can not only improve the classification performance of CNNs for different biological images, but also be widely applied to basic models of different architectures, which helps to improve the classification accuracy to a certain degree.

It is taken as another corresponding embodiment, and the corresponding embodiment of the system. The hardware structure is shown in FIG. 9.

Figure 9:
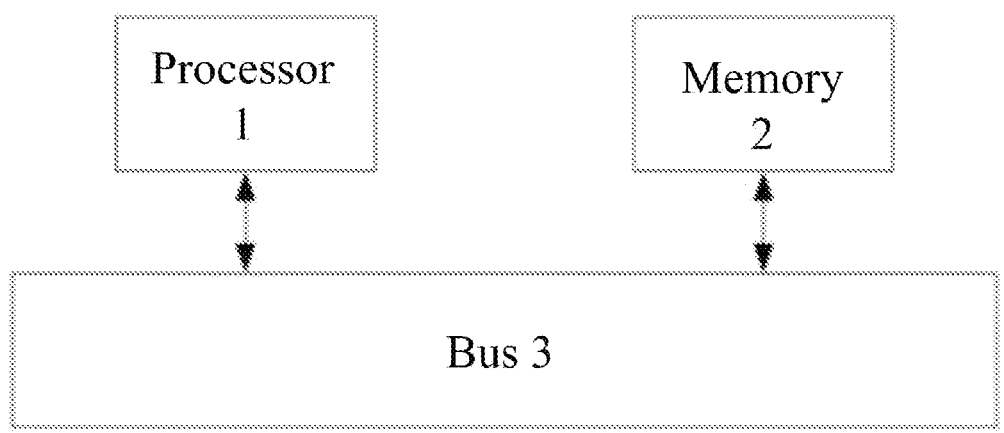
FIG. 9 shows a diagram of a hardware structure of a classification system according to the present disclosure.

In FIG. 9, the execution body of the processor 1 and the memory 2 can be a computer, a single-chip microcomputer, a microcontroller and other devices with computing functions. In a specific implementation, the embodiment of the present disclosure does not limit the execution main body, and choices may be made according to the needs of the practical disclosure.

Data signals are transmitted between the memory 2 and the processor 1 through a bus 3, which will not be repeated herein.

Based on the same inventive concept, the embodiments of the present disclosure further provide a computer-readable storage medium. The storage medium includes a stored program, and the program is run to control a device where the storage medium is located to implement the steps of the foregoing method described in the embodiments.

The computer-readable storage medium includes but is not limited to a flash memory, a hard disk, a solid state disk and the like.

It should be noted herein that the readable storage medium described in the above embodiments corresponds to the method described in the embodiments, which will not be repeated herein.

Some or all of the functions in the foregoing embodiments may be implemented by software, hardware, firmware, or any combination thereof. When software is used to implement the functions, some or all of the functions may be implemented in a form of a computer program product. The computer program product includes one or more computer instructions. When the computer program instructions are loaded and executed on a computer, the procedure or functions according to the embodiments of the present disclosure are completely or partially generated.

The computer may be a general-purpose computer, a dedicated computer, a computer network, or another programmable apparatus. Computer instructions can be stored in a computer-readable storage medium or transmitted through a computer-readable storage medium. The computer-readable storage medium may be any usable medium accessible by a computer, or a data storage device, such as a server or a data center, integrating one or more usable media. The usable medium may be a magnetic medium, a semiconductor medium, or the like.

Through the description of the foregoing implementations, those skilled in the art can clearly understand that the foregoing embodiments can be implemented by either software or software plus a necessary universal hardware platform. Based on this understanding, the technical solutions according to the embodiments of the present disclosure may be implemented in a form of a software product. The software product may be stored in a non-volatile storage medium (which may be a USB flash drive, a removable hard disk, or the like), and includes a plurality of instructions to enable a computer device (which may be a personal computer, a server, a network device, or the like) to perform the method according to the embodiments of the present disclosure.

It should be noted herein that the system described in the above embodiment corresponds to the method described in the embodiment, which will not be repeated herein.

The above merely describes a preferred example of the present disclosure, but the protection scope of the present disclosure is not limited thereto. A person skilled in the art can easily conceive modifications or replacements within the technical scope of the present disclosure, and these modifications or replacements shall fall within the protection scope of the present disclosure. Therefore, the protection scope of the present disclosure should be subject to the protection scope defined by the claims.

What is claimed is:

1. A hierarchical constraint (HC)-based method for classifying fine-grained graptolite images, comprising:
    training a Convolutional Neural Network (CNN) model, which comprises:
    step 1, collecting original graptolite images;
    step 2, annotating fine granularity of graptolite specimens in the original graptolite images;
    step 3, according to annotation results of fine granularity, conducting cropping at a pixel level, cropping by an annotation box, and data enhancement on the original graptolite images to obtain preprocessed graptolite images representing the graptolite specimens, and constructing a graptolite dataset;
    step 4, extracting features in the preprocessed graptolite images by the CNN model, which comprises: extracting a feature map from a preprocessed graptolite image inputted, by convolution, activation and pooling operation of the CNN model, to obtain a feature vector; and projecting, by an embedding layer, the feature vector into a feature with a dimension being a number of categories in the dataset, wherein a feature vector obtained after projection represents a prediction vector of the CNN model to the preprocessed graptolite image, each value in the prediction vector represents a prediction score of a corresponding category of the preprocessed graptolite image, and the higher the prediction score, the greater the probability that a graptolite in the preprocessed graptolite image belongs to this category;
    step 5, calculating a similarity between the preprocessed graptolite images, and performing weighting according to a genetic relationship among species to obtain a weighted HC loss function (HC-Loss) of all preprocessed graptolite images, which comprises:
    dividing preprocessed graptolite images in a same batch randomly into multiple groups of preprocessed graptolite image pairs, each group of preprocessed graptolite image pairs comprising two preprocessed graptolite images; for two preprocessed graptolite images in each preprocessed graptolite image pair, quantifying a similarity weight according to the genetic relationship of categories graptolites in the two preprocessed graptolite images belong, wherein for the preprocessed graptolite images belonging to two categories, the closer the genetic relationship is, the greater the degree of similarity is, and the greater the similarity weight value is; on the contrary, the farther the genetic relationship is, the smaller the similarity weight value is; and
    in each training batch, calculating the weighted HC-Loss of all preprocessed graptolite images by the following process: calculating a Euclidean distance between prediction vectors of two preprocessed graptolite images in each preprocessed graptolite image pair; according to the similarity weight value for each preprocessed graptolite image pair, making weighted summation on the similarity of all groups of preprocessed graptolite image pairs, and dividing a sum by the number of groups to obtain weighted HC-Loss of all preprocessed graptolite images;
    step 6, calculating cross-entropy loss (CE-Loss) used to represent a difference between predicted probability distribution of the CNN model and real label distribution of images;
    step 7, taking a weighted sum of HC-Loss and CE-Loss as a total loss function of the CNN model in a training stage; and
    step 8, ending the training to obtained a trained CNN model; and
    classifying a target graptolite image collected, which comprises:
    step 9, inputting the target graptolite image into the trained CNN model; and
    step 10, classifying the target graptolite image using the trained CNN model to obtain a classification of the target graptolite image.

2. The method for classifying fine-grained graptolite images according to claim 1, wherein in step 1, the collected original graptolite images comprise high-resolution images covering various families, genera and species.

3. The method for classifying fine-grained graptolite images according to claim 1, wherein step 4 is executed by the following process: extracting, from a preprocessed graptolite image x, a feature map $f_x$ with respect to x by the convolution, activation and pooling operation of the CNN model, and setting a size of $f_x$ to C×H×W, wherein C, H and W denote a channel, a height and a width of the feature map, respectively; and expanding the feature map $f_x$ to a feature vector with one dimension being C×H×W, and projecting the feature vector into a feature vector with a dimension of N through an embedding layer, wherein N denotes a number of categories in a dataset, the embedding layer is implemented through a fully connected layer, and the final image feature vector represents a prediction vector of the CNN model to the preprocessed graptolite-image x.

4. The method for classifying fine-grained graptolite images according to claim 3, wherein the Euclidean distance between prediction vectors of two preprocessed graptolite images in each preprocessed graptolite image pair is expressed as follows:

$$d(\varphi(x_m), \varphi(x_n)) = \sqrt{\sum_{i=1}^{N}(\varphi(x_m)_i, \varphi(x_n)_i)^2}$$

wherein $(x_m, x_n)$ denotes a preprocessed graptolite image pair, $\varphi(x)$ denotes a prediction vector regarding a preprocessed graptolite image x extracted from the CNN model, $\varphi(x)_i$ denotes an ith element in the prediction vector, and $d(\cdot)$ denotes a Euclidean distance.

5. The method for classifying fine-grained graptolite images according to claim 1, wherein in step 5, said setting a similarity weight value for a preprocessed graptolite image pair according to the categories and genetic relationship specifically comprises:
if two preprocessed graptolite images of a preprocessed graptolite image pair belong to the same category and a lowest common parent category is at a species level, setting the similarity weight value to 0;
if two preprocessed graptolite images of a preprocessed graptolite image pair belong to different species of the same genus and a lowest common parent category is at a genus level, setting the similarity weight value to 1.0;
if two preprocessed graptolite images of a preprocessed graptolite image pair belong to different genera of the same family and a lowest common parent category is at a family level, setting the similarity weight value to be greater than 0.5 and less than 1.0; and
if two preprocessed graptolite images of a preprocessed graptolite image pair belong to different families and a lowest common parent category is at an order level, setting the similarity weight value to be greater than 0.1 and less than 0.3.

6. The method for classifying fine-grained graptolite images according to claim 5, wherein in step 5, if two preprocessed graptolite images of a preprocessed graptolite image pair belong to different genera of the same family and the lowest common parent category is at a family level, the similarity weight value is set to 0.6.

7. The method for classifying fine-grained graptolite images according to claim 5, wherein in step 5, if two preprocessed graptolite images of a preprocessed graptolite image pair belong to different families and the lowest common parent category is at an order level, the similarity weight value is set to 0.2.

8. An HC-based system for classifying fine-grained graptolite images, comprising a processor and a memory, wherein the memory has a program instruction stored therein, and the processor calls the program instruction stored in the memory to enable the system to perform the steps of the method according to claim 1.

9. The HC-based system for classifying fine-grained graptolite images according to claim 8, wherein in step 1, the collected original graptolite images comprises high-resolution images covering various families, genera and species.

10. The HC-based system for classifying fine-grained graptolite images according to claim 8, wherein step 4 is executed by the following process: extracting, from a preprocessed graptolite image x, a feature map $f_x$ with respect to x by the convolution, activation and pooling operation of the CNN model, and setting a size of $f_x$ to C×H×W, wherein C, H and W denote a channel, a height and a width of the feature map, respectively; and expanding the feature map $f_x$ to a feature vector with one dimension being C×H×W, and projecting the feature vector into a feature vector with a dimension of N through an embedding layer, wherein N denotes a number of categories in a dataset, the embedding layer is implemented through a fully connected layer, and the final image feature vector represents a prediction vector of the CNN model to the preprocessed graptolite image x.

11. The HC-based system for classifying fine-grained graptolite images according to claim 10, wherein the Euclidean distance between prediction vectors of two preprocessed graptolite images in each preprocessed graptolite image pair is expressed as follows:

$$d(\varphi(x_m), \varphi(x_n)) = \sqrt{\sum_{i=1}^{N}(\varphi(x_m)_i, \varphi(x_n)_i)^2}$$

wherein $(x_m, x_n)$ denotes a preprocessed graptolite image pair, $\varphi(x)$ denotes a prediction vector regarding a preprocessed graptolite image x extracted from the CNN model, $\varphi(x)_i$ denotes an ith element in the prediction vector, and $d(\cdot)$ denotes a Euclidean distance.

12. The HC-based system for classifying fine-grained graptolite images according to claim 8, wherein in step 5, said setting a similarity weight value for a preprocessed graptolite image pair according to the categories and genetic relationship specifically comprises:
if two preprocessed graptolite images of a preprocessed graptolite image pair belong to the same category and a lowest common parent category is at a species level, setting the similarity weight value to 0;
if two preprocessed graptolite images of a preprocessed graptolite image pair belong to different species of the same genus and a lowest common parent category is at a genus level, setting the similarity weight value to 1.0;
if two preprocessed graptolite images of a preprocessed graptolite image pair belong to different genera of the same family and a lowest common parent category is at a family level, setting the similarity weight value to be greater than 0.5 and less than 1.0; and
if two preprocessed graptolite images of a preprocessed graptolite image pair belong to different families and a lowest common parent category is at an order level, setting the similarity weight value to be greater than 0.1 and less than 0.3.

13. The HC-based system for classifying fine-grained graptolite images according to claim 12, wherein in step 5, if two preprocessed graptolite images of a preprocessed graptolite image pair belong to different genera of the same family and the lowest common parent category is at a family level, the similarity weight value is set to 0.6.

14. The HC-based system for classifying fine-grained graptolite images according to claim 12, wherein in step 5, if two preprocessed graptolite images of a preprocessed graptolite image pair belong to different families and the lowest common parent category is at an order level, the similarity weight value is set to 0.2.

15. A non-transitory computer-readable storage medium, wherein the computer-readable storage medium stores a computer program that comprises program instructions, and the program instructions, when executed by a processor, enables the processor to perform the steps of the method according to claim 1.

16. The non-transitory computer-readable storage medium according to claim 15, wherein in step 1, the collected original graptolite images comprises high-resolution images covering various families, genera and species.

17. The non-transitory computer-readable storage medium according to claim 15, wherein step 4 is executed by the following process: extracting, from a preprocessed graptolite image x, a feature map $f_x$ with respect to x by the convolution, activation and pooling operation of the CNN model, and setting a size of $f_x$ to C×H×W, wherein C, H and W denote a channel, a height and a width of the feature map, respectively; and expanding the feature map $f_x$ to a feature vector with one dimension being C×H×W, and projecting the feature vector into a feature vector with a dimension of N through an embedding layer, wherein N denotes a number of categories in a dataset, the embedding layer is implemented through a fully connected layer, and the final image feature vector represents a prediction vector of the CNN model to the preprocessed graptolite image x.

18. The non-transitory computer-readable storage medium according to claim 17, wherein the Euclidean distance between prediction vectors of two preprocessed graptolite images in each preprocessed graptolite image pair is expressed as follows:

$$d(\varphi(x_m), \varphi(x_n)) = \sqrt{\sum_{i=1}^{N}(\varphi(x_m)_i, \varphi(x_n)_i)^2}$$

wherein $(x_m, x_n)$ denotes a preprocessed graptolite image pair, $\varphi(x)$ denotes a prediction vector regarding a preprocessed graptolite image x extracted from the CNN model, $\varphi(x)_i$ denotes an ith element in the prediction vector, and $d(\cdot)$ denotes a Euclidean distance.

19. The non-transitory computer-readable storage medium according to claim 15, wherein in step 5, said setting a similarity weight value for a preprocessed graptolite image pair according to the categories and genetic relationship specifically comprises:
  if two preprocessed graptolite images of a preprocessed graptolite image pair belong to the same category and a lowest common parent category is at a species level, setting the similarity weight value to 0;
  if two preprocessed graptolite images of a preprocessed graptolite image pair belong to different species of the same genus and a lowest common parent category is at a genus level, setting the similarity weight value to 1.0;
  if two preprocessed graptolite images of a preprocessed graptolite image pair belong to different genera of the same family and a lowest common parent category is at a family level, setting the similarity weight value to be greater than 0.5 and less than 1.0; and
  if two preprocessed graptolite images of a preprocessed graptolite image pair belong to different families and a lowest common parent category is at an order level, setting the similarity weight value to be greater than 0.1 and less than 0.3.

20. The non-transitory computer-readable storage medium according to claim 19, wherein in step 5, if two preprocessed graptolite images of a preprocessed graptolite image pair belong to different genera of the same family and the lowest common parent category is at a family level, the similarity weight value is set to 0.6.

* * * * *